(No Model.) 2 Sheets—Sheet 1.

H. C. NICHOLSON.
Quadruplex Telegraph.

No. 234,197. Patented Nov. 9, 1880.

Witnesses
Franck L. Ourand
C. H. Neale

Inventor
Henry C. Nicholson
by his attorneys
Gibs & Doolittle

N. PETERS, PHOTO-LITHOGRAPHER, WASHINGTON, D C.

(No Model.)

2 Sheets—Sheet 2.

H. C. NICHOLSON.
Quadruplex Telegraph.

No. 234,197.

Patented Nov. 9, 1880.

UNITED STATES PATENT OFFICE.

HENRY C. NICHOLSON, OF KENTON, KENTUCKY.

QUADRUPLEX TELEGRAPH.

SPECIFICATION forming part of Letters Patent No. 234,197, dated November 9, 1880.

Application filed August 28, 1880. (No model.)

To all whom it may concern:

Be it known that I, HENRY C. NICHOLSON, a citizen of the United States, residing at Kenton, in the county of Kenton and State of Kentucky, have invented certain new and useful Improvements in Multiple Telegraphs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention was primarily designed to be used in connection with that class of double-transmission and quadruplex telegraphs in which the double-current system is combined with the single-current system; but part of the invention is adapted for use on any double-current system of single-transmission telegraphy.

The object of the invention is to reverse the polarity of the line-current by substitution of battery instead of by reversal of battery, in order that atmospheric disturbances may be more easily compensated.

To this end the invention consists, mainly, in combining with a double-current key or transmitter two sections of battery which are alternately put in and cut out of circuit by the operation of said key or transmitter.

Figure 1:
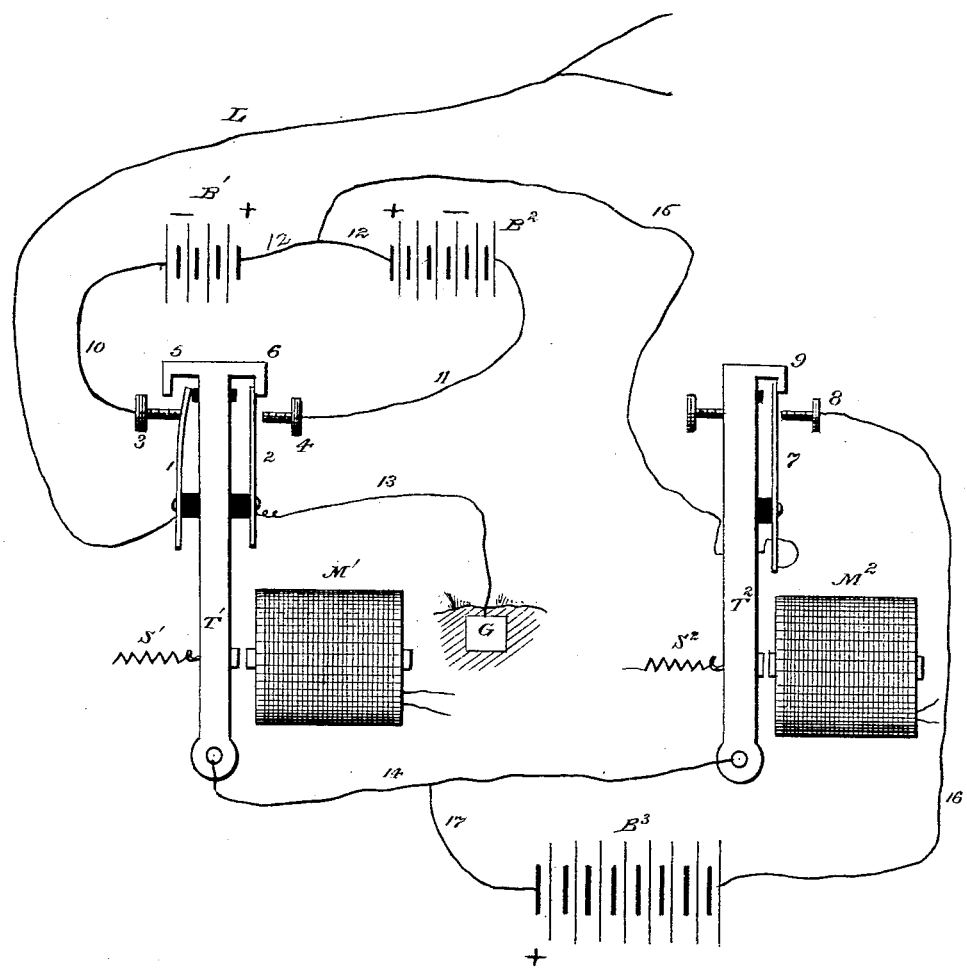
Figure 2:
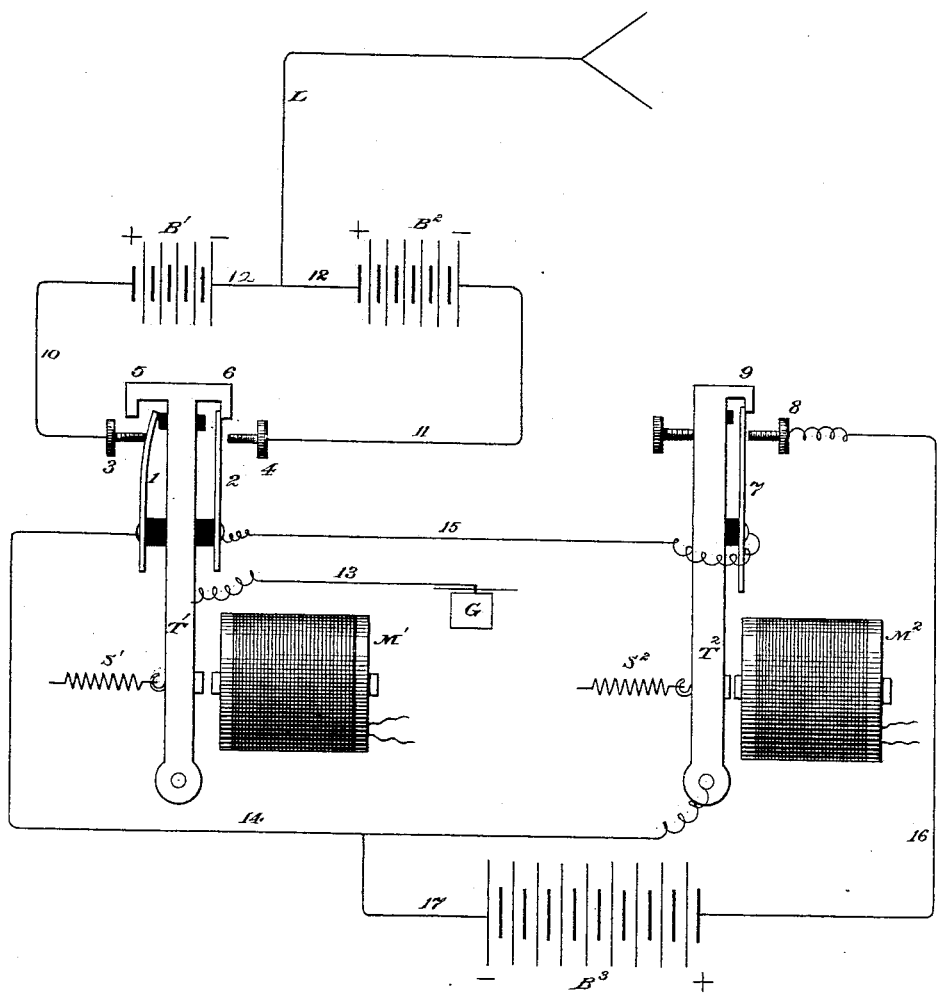

In the annexed drawings, Figure 1 illustrates the two transmitters with batteries and circuit-connections at a terminal station of a quadruplex telegraph embodying my invention. Fig. 2 shows another form of the invention.

The same letters are used in both the figures in the designation of identical parts.

The transmitters $T'$ and $T^2$ are respectively moved in one direction by the electro-magnets $M'$ and $M^2$ included in suitable local circuits (not shown) controlled by ordinary finger-keys in manner well understood by electricians. Retractile springs $S'$ and $S^2$ move the transmitters in the opposite direction. The double-current transmitter shown is constructed with two contact-springs, 1 and 2, mounted thereon on insulated posts and extending past the contact-screws 3 and 4 into the hooks 5 and 6 of the transmitter. The single-current transmitter shown is constructed with a single contact-spring, 7, which is mounted thereon on an insulated post and extends past the contact-screw 8 into the hook 9 of the transmitter.

The double-current transmitter controls two batteries or sections of battery $B'$ and $B^2$, and the single-current transmitter controls a third battery or section of battery $B^3$.

According to the arrangement shown in Fig. 1 the contact-screw 3 is connected by wire 10 to the negative pole of battery $B'$, and the contact-screw 4 is connected by wire 11 to the negative pole of battery $B^2$. The positive poles of batteries $B'$ and $B^2$ are connected by junction-wire 12.

The line L is connected by contact-spring 1, while the contact-spring 2 is connected by wire 13 to ground G. A wire, 14, connects transmitter $T'$ with transmitter $T^2$, and a wire, 15, connects the junction-wire 12 with the contact-spring 7 of transmitter $T^2$. Contact-screw 8 is connected by wire 16 to the negative pole of battery or section of battery $B^3$, the positive pole of which is connected by wire 17 to wire 14. The diagram thus described shows the transmitters in normal or open position.

The electrical conditions of the line due to the operation of the transmitters may be stated as follows: When both transmitters are open the circuit, taking the ground G as the starting-point, is through the elements 13 2 6 $T'$ 14 $T^2$ 9 7 15 12 $B'$ 10 3 1 to line L, so that the line is charged with a negative current from battery $B'$. When transmitter $T'$ is closed and transmitter $T^2$ is open the route from the ground G will be through the elements 13 2 4 11 $B^2$ 12 15 7 9 $T^2$ 14 $T'$ 5 1 to line L, so that the line will be charged with a positive current from battery $B^2$. When transmitter $T^2$ is closed and transmitter $T'$ open the route from ground G will be by way of the elements 13 2 6 $T'$ 14 17 $B^3$ 16 8 7 15 12 $B'$ 10 3 1 to line L, so that the line will be charged with a negative current from the combined or joined batteries $B^3$ and $B'$. When both transmitters, $T'$ and $T^2$, are closed the route from ground G will be through the elements 13 2 4 11 $B^2$ 12 15 7 8 16 $B^3$ 17 14 $T'$ 5 1 to line L, so that the line will be charged with a positive current from the combined or joined batteries $B^2$ and $B^3$, The batteries B' and B² may be of about equal strength, while the battery B³ should have two or three times the number of cells used for either battery B' or B².

The arrangement shown in Fig. 2 differs somewhat from that shown in Fig. 1, the differences growing out of the reversed position of battery B', the positive pole of which is now connected with contact-screw 3, while its negative pole is connected by junction-wire 12 to the positive pole of battery B². This reversal necessitates the following changes: The line L must proceed from junction-wire 12. Wire 15 must connect contact-spring 2 with contact-spring 7. Wire 13 from the ground G must connect with transmitter T', and wire 14 must connect transmitter T² with contact-spring 1 of transmitter T'. Battery B³ must also be reversed. In this modified arrangement the play of the currents is precisely the same as in the arrangement illustrated in Fig. 1, as may be easily ascertained by tracing the circuit under the four possible positions of the transmitters; but it has one important advantage. Since the batteries B' and B² under this arrangement confront each other with opposite poles, it is possible to change their relative strengths by disconnecting the line from junction-wire 12, and connecting it to a connecting-wire between any two cells of either battery. By such adjustments of the relative strengths of these batteries changes in atmospheric conditions may be more easily compensated than by adjustments of the relay alone. To facilitate such changes in the relative strengths of these batteries they should be placed near together, and several branch wires may be provided, running, respectively, from the junction-wire and connecting-wires of the cells of the batteries to a switch or switches, by which either branch can be connected to the line.

In applying my invention to a single-transmission telegraph operated on the double-current system wires 14 and 15 would be connected or combined in one wire.

I do not confine myself to the use of the particular double-current key or transmitter shown, since my invention may be practiced with other forms of double-current keys or transmitters.

I do not herein claim the combination at one station of a single main-line telegraph of two independent electrically-connected keys, one of which—say the first key—when operated, reverses the circuit controlled by the second key independently of the position or action of this second key, because said combination is described and claimed in my application for Letters Patent filed October 14, A. D. 1874; nor do I herein claim the combination at one station of two independent electrically-connected keys so arranged with respect to battery and a permanently-closed single main-line circuit that one of the keys transmits by changing the polarity of the line-current, while the other key transmits by changing the tension of the line-current, because said combination is embodied and claimed in my application for Letters Patent filed May 11, A. D. 1876; nor do I herein claim the construction of the double-current key, because that is also described and claimed in my application for Letters Patent filed May 11, A. D. 1876.

Having thus described my invention, what I claim as new is—

1. The combination, substantially as before set forth, of a double-current key or transmitter, and two sections of battery, alternately put in and cut out of circuit by the operation of said double-current key.

2. The combination, substantially as before set forth, of a double-current key or transmitter, and two sections of battery confronting each other with opposite poles and alternately put in and cut out of circuit by the operation of said double-current key.

3. The combination, substantially as before set forth, of a double-current key or transmitter, two sections of battery alternately put in and cut out of circuit by the operation of said double-current key, and a single-current key or transmitter adapted to add its own section of battery to whichever one of the said other two sections may be in circuit at the time when the single-current key is closed.

In testimony whereof I affix my signature in presence of two witnesses.

H. C. NICHOLSON.

Witnesses:
C. A. NEALE,
JAS. H. LANGE.